May 19, 1953     C. E. FERGUSON ET AL     2,638,831
GROUNDWORKING MACHINE

Filed Dec. 30, 1950     3 Sheets-Sheet 1

INVENTORS.
Carl E. Ferguson
Kendall Ferguson
Robert Clair Ferguson

BY
ATTORNEY.

May 19, 1953

C. E. FERGUSON ET AL 2,638,831

GROUNDWORKING MACHINE

Filed Dec. 30, 1950

INVENTORS.
Carl E. Ferguson
Kendall Ferguson
Robert Clair Ferguson

BY *Otura Earl*

ATTORNEY.

May 19, 1953   C. E. FERGUSON ET AL   2,638,831
GROUNDWORKING MACHINE
Filed Dec. 30, 1950   3 Sheets-Sheet 3

INVENTORS.
Carl E. Ferguson
Kendall Ferguson
Robert Clair Ferguson
BY
ATTORNEY.

Patented May 19, 1953

2,638,831

UNITED STATES PATENT OFFICE 2,638,831

GROUNDWORKING MACHINE

Carl Edwin Ferguson, Kendall Ferguson, and Robert C. Ferguson, Eau Claire, Mich., assignors to Berrien Tool and Die Company, Eau Claire, Mich., a corporation of Michigan Application December 30, 1950, Serial No. 203,725

16 Claims. (Cl. 97—44)

This invention relates to improvements in ground working machines.

The principal objects of this invention are:

First, to provide an improved form of machine for forming a multiplicity of small holes in golf greens, lawns and the like for ventilating or aerating the turf.

Second, to provide a ground piercing machine of simple construction in which the advancing motion of the ground piercing tools is performed by a horizontally oscillating motion relative to the carriage of the machine permitting the tools to remain horizontally stationary while they are engaged with the ground, even though the machine itself is continuously advanced.

Third, to provide a ground piercing machine with a novel form of tool driving and carriage driving mechanism which automatically disengages the carriage drive when the ground piercing tools are moved to inoperative position.

Fourth, to provide a ground working machine with ground piercing tools having a vertical reciprocating motion relative to the machine and an oscillatory horizontal reciprocating motion relative to the machine.

Fifth, to provide a ground working machine having ground piercing tools or prods and a relatively small number of connecting and driving parts for actuating the tools.

Other objects and advantages relating to details of our invention will be apparent from a consideration of the following description and claims.

The drawings, of which there are three sheets, illustrate two forms of our machine in each of which the ground working tools are given the same oscillatory and reciprocatory movement.

Fig. 3 is a fragmentary horizontal cross sectional view taken along the plane of the line 3—3 in Figs. 1 and 2.

Figure 1:
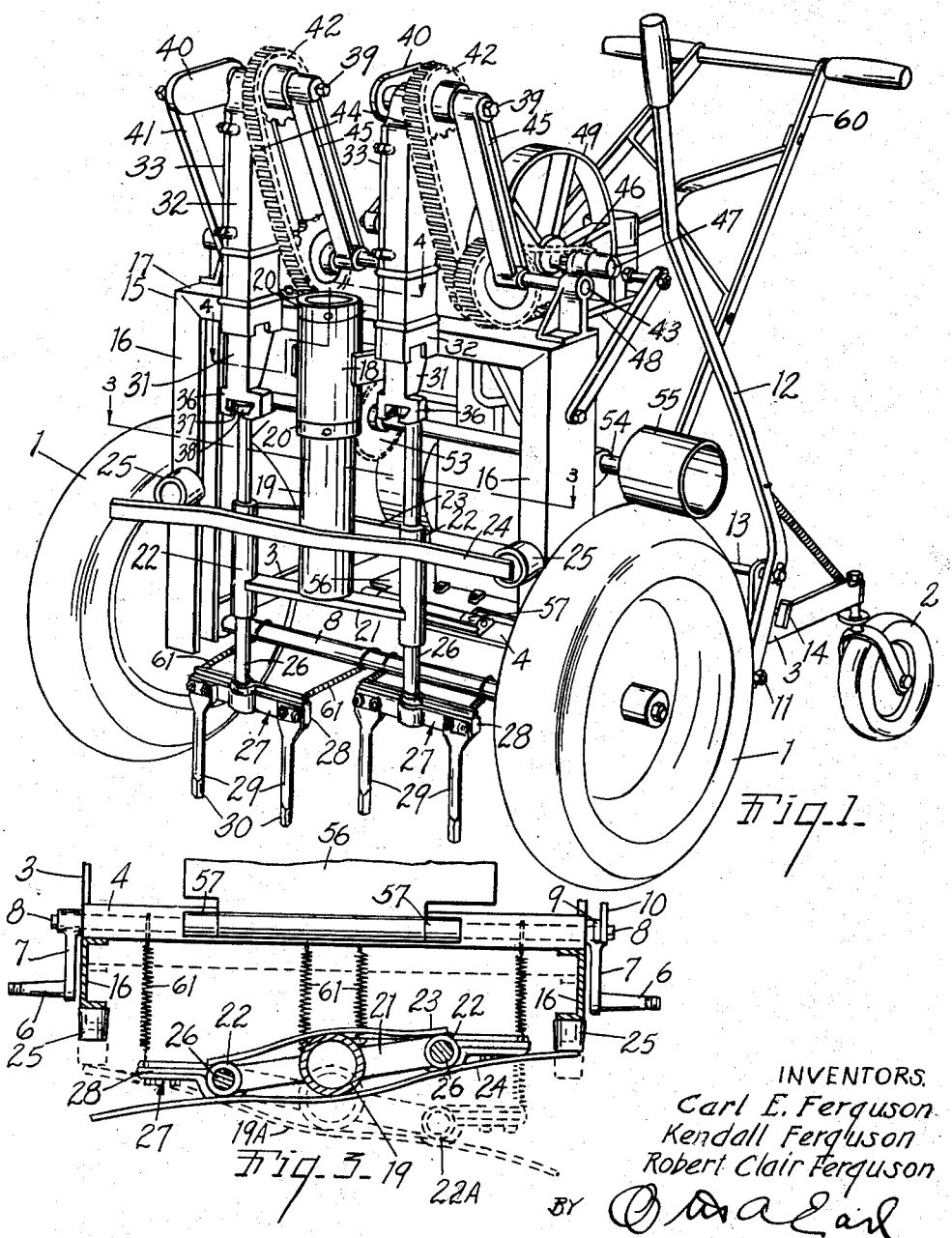
Fig. 1 is a perspective view of a first form of our machine.
Figure 2:
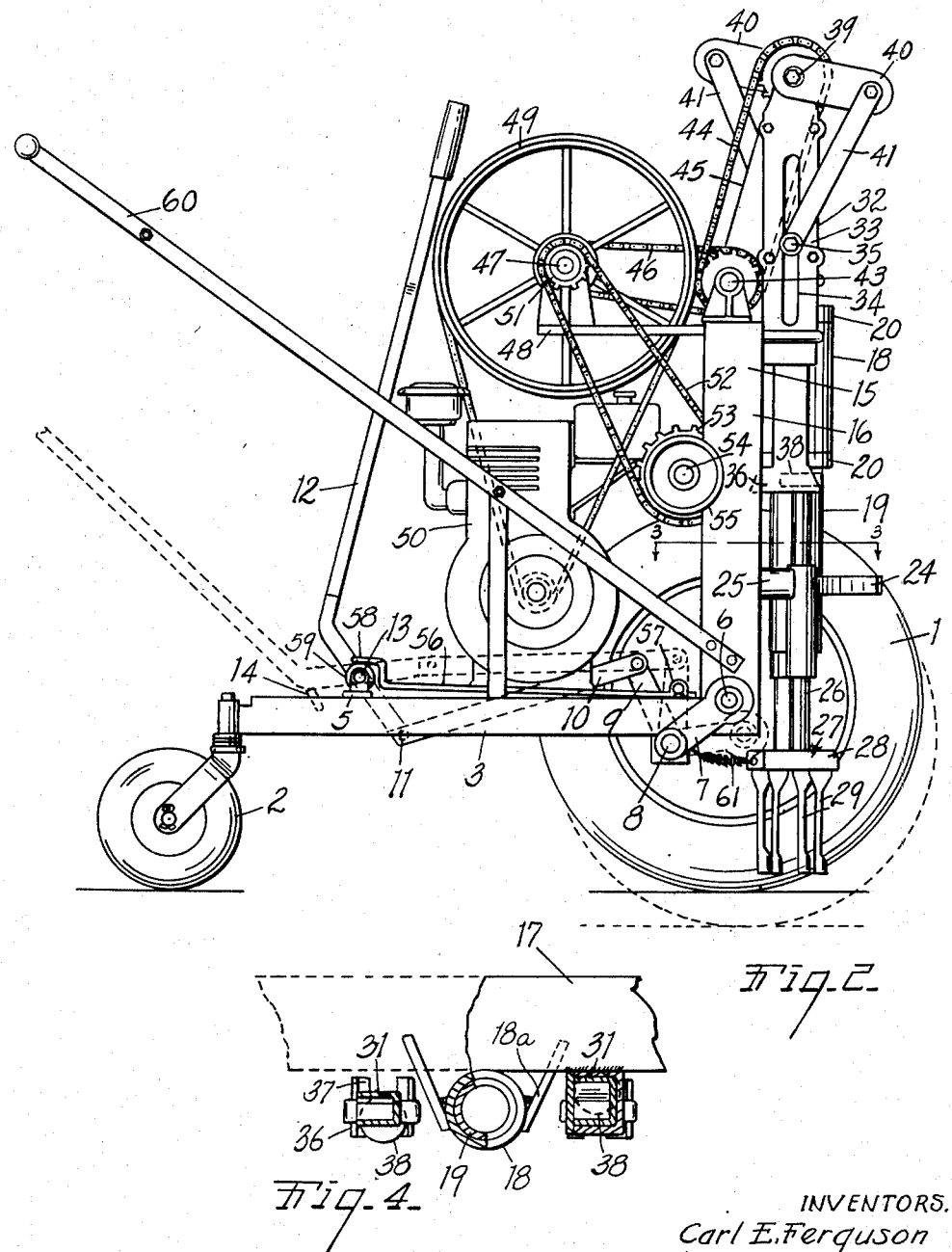
Fig. 2 is a side elevational view of the machine shown in Fig. 1.
Figure 4:
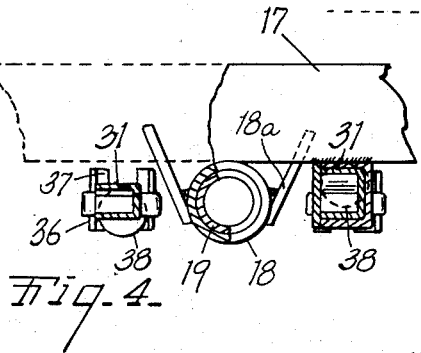
Fig. 4 is a fragmentary horizontal cross sectional view taken along the plane of the broken line 4—4 in Fig. 1.

The two forms of our machine illustrated constitute improvements on and simplifications of a similar ground working machine disclosed and claimed in our copending application, Serial No. 165,482, filed June 1, 1950, for Ground Working Machine.

In the first form of the machine illustrated in Figs. 1 to 4, there is provided a mobile carriage having front driving wheels 1 and rear caster wheels 2. The carriage may consist of any suitable framework and in the example illustrated includes longitudinal side members 3, 3 connected by a front cross member 4 and a rear cross member 5. The front driving wheels 1 are vertically adjustable relative to the framework of the carriage being mounted on hubs 6 carried by the suspension arms 7 on each side of the carriage. The suspension arms 7 are secured at their inner or pivoted ends to a transverse rock shaft 8 rotatably supported in bearings on the underside of the longitudinal frame members 3.

The left suspension arm 7 of the machine (the arm illustrated at the right of Fig. 3) is provided with an angularly extending crank arm 9 which extends generally vertically upwardly and is pivotally connected at its upper end to a toggle link 10. The link 10 extends rearwardly and downwardly to a pivotal connection 11 to the lower swinging end of the angled control lever 12. The lever 12 is pivotally mounted on a cross shaft 13, the shaft being rotatably supported above the rear cross member 5, as is most clearly shown in Fig. 2. Forward swinging motion of the upper end of the control lever 12 will draw the toggle link 10 and crank arm 9 rearwardly, causing the suspension arm 7 and driving wheels 1 to be elevated relative to the frame of the carriage. More precisely, the forward swinging of the lever 12 will permit the forward end of the frame to move downwardly to the driving wheels supported on the ground into the relationship illustrated in full lines in Fig. 2. Rearward motion of the control lever 12 moves the toggle link 10 forwardly and upwardly and causes forward rotation of the suspension arms 7 so that the forward end of the carriage is raised relative to the driving wheels into the position indicated by the dotted lines in Fig. 2. The toggle link 10 and the lower end of the control lever 12 move into an over-centering toggle relationship between the shaft 13 and the upper end of the crank arm 9 to lock the suspension mechanism in elevated position. A stop 14 on the right side frame member limits the over-centering motion of the toggle.

Secured to the forward end of the carriage is a vertical framework consisting of the downwardly opening U-shaped structure 15. The structure 15 consists of side members 16 and a cross member 17 of inwardly opening channel shaped cross section. Secured to the middle of the cross member 17 is a vertically disposed tubular bearing 18. Braces or gussets 18a welded to the bearing and the cross member 17 hold the bearing rigid with respect to the vertical framework.

Rotatably or oscillatably mounted in the bearing 18 is a tubular column 19 which extends downwardly substantially below the bearing 18. Thrust collars 20 secured to the column above and below the bearing 18 prevent axial motion of the column relative to the bearing. The lower end of the column has a transversely extending horizontal support bar 21 fixedly secured thereto, and the ends of the support bar are in turn fixedly connected to the vertically extending sleeves 22. The upper ends of the sleeves 22 are further rigidly connected and braced to the column 19 by a rear cross strap 23 and a front cross strap 24. It will thus be seen that the sleeves 22 are rotatable or oscillatable in a horizontal plane about the axis of the column 19. The front cross strap 24 is extended transversely to each side of the machine to coact with rubber bumpers 25 mounted on the front edges of the vertical side members 16 to limit oscillation of the sleeves 22.

Vertically reciprocably mounted in the sleeves 22 are a pair of tool rods 26. The rods 26 are rotatable within the sleeves as well as being reciprocable therein, and the rods each carry a tool head 27 at their lower end. The tool heads 27 include a horizontal cross piece projecting to each side of the rod as shown at 28, and two or more ground working tines 29 projecting downwardly from the cross piece. The tines 29 have hollow tubular tips 30 on their lower ends and are adapted to be forcibly pressed into the sod of a golf green or lawn to cut a small core from the turf to aerate the turf. Downward motion of the tips 30 forces a small core into the tubular section of the tip, and upward motion of the tool withdraws this core from the turf. Each succeeding core forces the preceding cores upwardly out of the tips, and the turf is provided with a series of small ventilating or aerating holes.

The mechanism for reciprocating the tool rods 26 and tines 29 consists of a pair of vertically disposed hollow rectangular slide bars 31. The slide bars 31 are vertically reciprocably guided in box slides 32 secured to the front surface of the cross member 17. The box slides 32 are provided with removable side cover plates 33, which permit the assembly of the slide bars 31 therein. The cover plates 33 are vertically slotted as at 34 in Fig. 2 to pass wrist pins 35 secured to the upper ends of the slide bars 31. The lower ends of the slide bars 31 have enlarged heads 36 forming downwardly opening T slots 37, and the upper ends of the slide rods 26 are provided with circular heads 38, which are longitudinally slidably received in the T slots 37. Thus reciprocation of the slide bars 31 will vertically reciprocate the tines 29, while the longitudinally slidable engagement of the heads 38 in the T slots accommodates horizontal oscillation of the slide rods and tools. Movement of the slide rods 26 longitudinally of the machine is limited by the engagement of the cross bar 24 with the bumpers 25 so that the heads 38 are never disengaged from vertical reciprocating engagement with the T slots of the slide bars 31.

The upper ends of the box slides 32 are shaped to provide transversely extending horizontal bearings which receive the crank shafts 39. The shafts 39 extend transversely through the bearings and are provided on their right ends with crank arms 40. The crank arms 40 operate connecting rods 41 extending to the pins 35 on the slide bars for reciprocating the bars. The opposite ends of the crank shafts 39 carry driving sprockets 42, and the sprockets are drivingly connected to a cross shaft 43 by the chains 44. Desirably the overhanging ends of the shafts 39 are braced relative to the cross shaft 43 by means of the bracing rods 45 having bearing connections to the shaft 43 and shafts 39. It will be noted that the crank arms 40 are disposed at 180° opposite angles with respect to the rotation of the crank shafts and cross shaft so that one tool head 27 is down when the other tool head is up.

The cross shaft 43 is driven through a chain 46 from a drive shaft 47. The shaft 47 is supported in suitable bearings on a bracket structure 48 extending rearwardly from the top cross member 17. The driving shaft 47 carries a large speed reducing pulley wheel 49 adapted to be belt connected to a gasoline motor 50 on the carriage. The drive shaft 47 also carries a sprocket 51 which drives a chain 52 extending downwardly and forwardly to a sprocket 53 on the carriage drive shaft 54. The carriage drive shaft 54 is rotatably supported in bearings on the rear edges of the vertical side frame 16 and carries drive rollers 55 on its outer ends. The rollers 55 are brought into frictional driving engagement with the driving wheels 1 by forward motion of the control lever 12, as previously described.

The motor 50 is secured to a bed plate 56, and the forward edge of the bed plate has a transverse horizontal hinged connection 57 to the front cross member 4 of the carriage. The rear edge of the bed plate 56 is provided with a downwardly facing hook surface 58 overlying the shaft 13 which supports the control lever 12. An eccentric cam 59 on the shaft 13 adjustably supports the surface 58 and is arranged so that movement of the control lever 12 and shaft 13 to move the carriage to inoperative position will also raise the rear edge of the bed plate 56 about the hinge connection 57. This motion of the bed plate has the effect of raising the motor 50 relative to the pulley wheel 49 and loosening the belt connection between the motor and the pulley. Thus the movement of the control lever 12 simultaneously disengages the drive rollers 55 from the driving wheels 1 and disconnects the motor from the crank shafts 39 and tool heads 27 so that the machine may be wheeled or pushed manually from place to place without the operation of the tool heads but without necessarily shutting down the gasoline motor 50. A handle structure 60 is provided for manually pushing the machine.

In operation of the machine, the tool heads and tines will be alternately pressed downwardly into the ground, as previously described. Simultaneously with the reciprocation of the tines, the machine will move forwardly under the influence of the rollers 55 and wheels 1 so that a walking action of the tines along the turf is provided. This walking action is most clearly illustrated by a consideration of Fig. 3, in which it may be assumed that the left slide rod 26 and the tines carried thereby are in down ground engaging position. Prior to full retraction of the left tines, the machine will have moved forwardly causing the column 19 to assume the horizontally displaced position indicated by the dotted lines at 19A. The tines on the left tool head being engaged in the ground and therefore horizontally immovable will cause the column 19 and the supporting rods for the sleeves 22 to oscillate correspondingly so that the right sleeve 22 assumes the horizontally advanced position indicated by the dotted lines at 22A. As the slide rods and sleeves reach the positions indicated by the dotted lines, the left slide rod 26 will be retracted from the ground and the right slide rod will be moved downwardly to engage the tines carried by it with the ground. In order to maintain the tool heads 27 in generally parallel relationship transversely of the path of travel of the machine, coil springs 61 are connected between the ends of the cross members 29 and the rock shaft 8. The horizontal spacing between the sets of holes formed by the tines 30 may be varied considerably by pushing or holding back on the handle 60 to aid or oppose the motor in driving the machine forwardly. Since the tines reciprocate at a relatively constant rate, variation in the horizontal advance of the machine will, of course, vary the spacing of the holes.

Figures 5, 6:
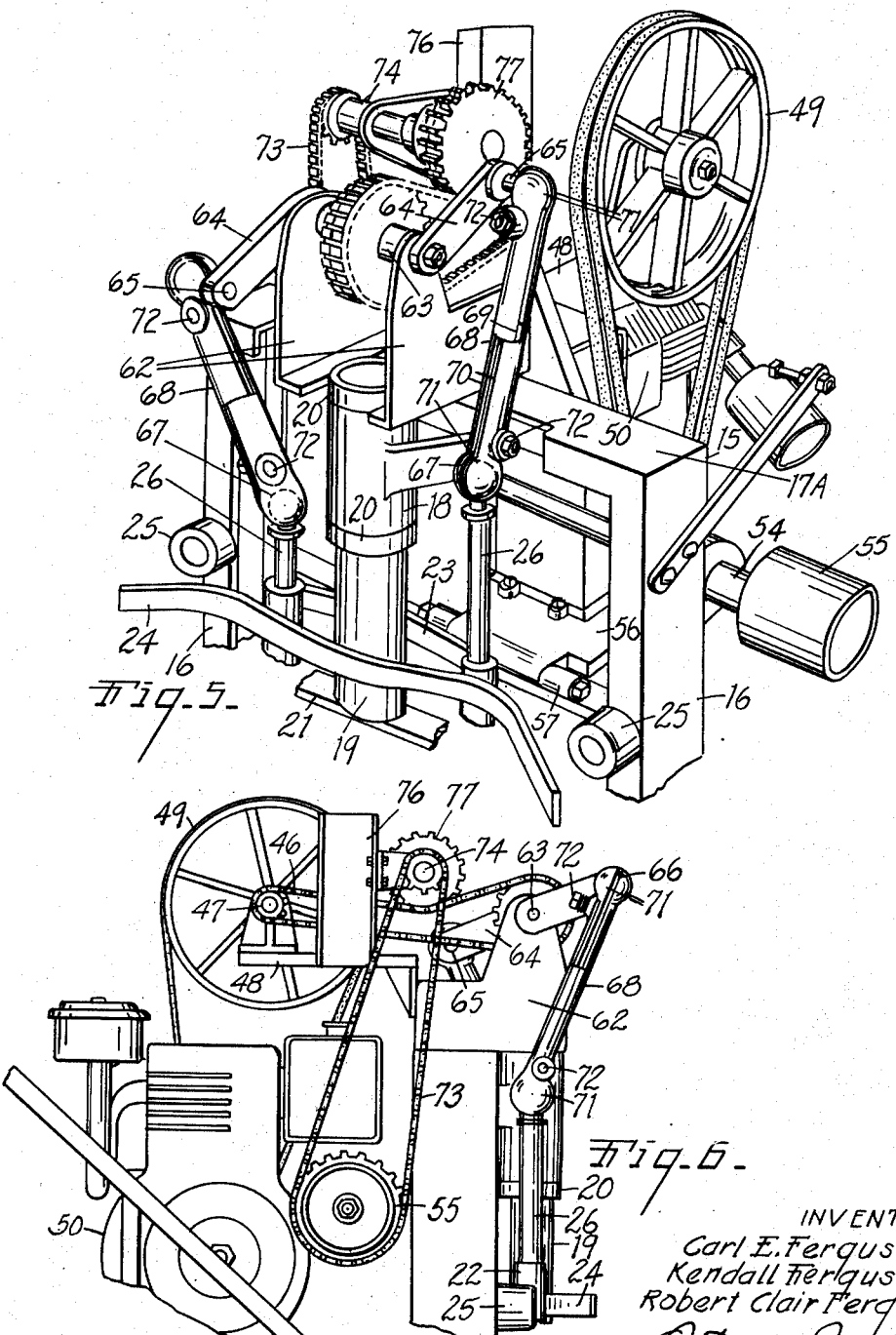
Fig. 5 is a fragmentary respective view of a modified form of our machine with a somewhat simplified driving connection for the ground working tools.
Fig. 6 is a fragmentary side elevational view of the modified form of our machine shown in Fig. 5.

In the modified form of the machine illustrated in Figs. 5 to 6, the carriage and motor mounting are the same as in the machine just described. The slide rods 26 and their associated tool heads, not illustrated, are also of the same construction and oscillatable mounting as previously described. The modification lies in the driving connections from the motor to the slide rods 26, and these will now be described.

The top cross member 17A of the vertical framework 15 carries the tubular bearing 18 in much the same fashion as in the first form of the machine. Transversely spaced, horizontally and longitudinally extending bearing plates 62 are secured to the top of the cross member on each side of the bearing 18 and rotatably support a transverse crank shaft 63. The ends of the crank shaft 63 carry the oppositely directed crank arms 64, and each of the crank arms carries at its outer end a laterally extending pin 65 having a ball head 66. The upper ends of the slide rods 26 are provided with similar balls 67, and the cranks 64 are directly connected to the slide rods 26 by means of the connecting rods 68. The connecting rods 68 include a solid mid section 69 having opposed spaced socket forming plates 70 extending from each end thereof. The plates which extend upwardly are rotated 90° from the plates which extend downwardly, and all of the plates have hemispherical socket forming portions 71 on their outer ends. Clamp bolts 72 extend through each opposed pair of socket plates to tightly and operatively clamp the socket portions 71 about the balls 66 and 67. This construction eliminates the box slides 32 and slide bars 31 of the first described form of the machine and is therefore somewhat more simplified and desirable than the first form of the machine.

The crank shaft 63 is driven from the drive shaft 47 by a chain 46 as in the first form of the machine. The drive shaft 47 is supported by a similar bracket structure 48 from the front cross member 17A. The carriage driving shaft 54 and rollers 55 are driven by means of a chain 73 which extends upwardly to an intermediate shaft 74 carried by a suitable bracket structure 76 over the chain 46. A sprocket 77 on the shaft 74 serves both to tighten the chain 46 and drive the shaft 74. In other respects, the construction and operation of the modified form of the machine is the same as in the first form described.

We have thus described two highly efficient forms of our machine with two forms of driving connections. Quite obviously other driving connections and mounting arrangements of the several elements of the machines may be devised depending upon manufacturing expediency, and we do not limit our invention to the particular structures illustrated.

Having thus described our invention, what we claim as new and desire to secure by Letters Patent is:

1. In a ground working machine, the combination of a carriage having a vertically extending transverse frame on the forward end thereof, suspension arms pivotally supported on said carriage toward the front thereof and having laterally projecting hubs on their swinging ends, traction wheels mounted on said hubs, traction rollers rotatably carried by said transverse frame and in the plane of said wheels, lever and link means carried by said carriage and connected to said suspension arms to move the latter whereby said traction wheels move into and out of engagement with said traction rollers, a vertically disposed elongated bearing secured to said transverse frame between said wheels, a column rotatably mounted in said bearing and projecting therebelow, a tool supporting structure secured to said column and extending laterally therefrom, a pair of vertically extending sleeves carried by said supporting structure on opposite sides of said column, portions of said supporting structure projecting laterally to engage the sides of said transverse frame and limit oscillation of said column and said sleeves, a pair of slide rods vertically reciprocable in said sleeves and having tine supporting heads on their lower ends, springs biasing said heads to extend laterally of said carriage, a motor hingedly supported on said carriage, crank means supported on top of said transverse frame, means forming a driving connection between said motor and said crank means and including a belt releasable upon movement of said motor about its hinged connection, other driving means connecting said motor to said traction rollers, said suspension arm operating lever having a cam connected thereto to move said motor on its hinged connection, and connecting rods connecting said crank means with said slide rods to oppositely reciprocate said slide rods.

2. In a ground working machine, the combination of a carriage having a transverse frame on the forward end thereof, suspension arms pivotally supported on said carriage toward the front thereof and having laterally projecting hubs on their swinging ends, traction wheels mounted on said hubs, traction rollers rotatably carried by said transverse frame and in the plane of said wheels, lever means carried by said carriage and connected to said suspension arms to move the latter whereby said traction wheels move into and out of engagement with said traction rollers, a vertically disposed elongated bearing secured to said transverse frame between said wheels, a column rotatably mounted in said bearing and projecting therebelow, a tool supporting structure secured to said column and extending laterally therefrom, a pair of vertically extending sleeves carried by said supporting structure on opposite sides of said column, portions of said supporting structure projecting laterally to engage the sides of said transverse frame and limit oscillation of said column and said sleeves, a pair of slide rods vertically reciprocable in said sleeves and having tine supporting heads on their lower ends, springs biasing said heads to extend laterally of said carriage, a motor supported on said carriage, crank means supported on top of said transverse frame, means forming a driving connection between said motor and said crank means, other driving means connecting said motor to said traction rollers, and connecting rods connecting said crank means with said slide rods to oppositely reciprocate said slide rods.

3. In a ground working machine, the combination of a carriage having a vertically extending transverse frame on the forward end thereof, suspension arms pivotally supported on said carriage toward the front thereof and having laterally projecting hubs on their swinging ends, traction wheels mounted on said hubs, traction rollers rotatably carried by said transverse frame and in the plane of said wheels, lever means carried by said carriage and connected to said suspension arms to move the latter whereby said traction wheels move into and out of engagement with said traction rollers, a tool supporting structure pivotally supported on the front of said frame and swingable about a vertical axis and extending laterally therefrom, vertical sleeves carried by said supporting structure on opposite sides of said axis, portions of said supporting structure projecting laterally to engage the sides of said vertical frame and limit oscillation of said sleeves, a pair of slide rods vertically reciprocable along said sleeves and having tine supporting heads on their lower ends, spring means biasing said heads to extend transversely of said carriage, a motor on said carriage, crank means supported on top of said frame, means forming a driving connection between said motor and said crank means, vertical slideways on said frame located over said slide rods, slides in said slideways and having vertically reciprocating driving connections and longitudinally sliding connections at their lower ends to the upper ends of said slide rods, other driving means connecting said motor to said traction rollers, and connecting rods connecting said crank means with said slides to oppositely reciprocate said slide rods.

4. In a ground working machine, the combination of a carriage having a vertically extending transverse frame on the forward end thereof, suspension arms pivotally supported on said carriage toward the front thereof and having laterally projecting hubs on their swinging ends, traction wheels mounted on said hubs, traction rollers rotatably carried by said transverse frame and in the plane of said wheels, lever means carried by said carriage and connected to said suspension arms to move the latter whereby said traction wheels move into and out of engagement with said traction rollers, a tool supporting structure pivotally supported on the front of said frame and swingable about a vertical axis and extending laterally therefrom, vertical guides carried by said supporting structure on opposite sides of said axis, portions of said supporting structure projecting laterally to engage the sides of said vertical frame and limit oscillation of said guides, a pair of slide rods vertically reciprocable along said guides and having tine supporting heads on their lower ends, a motor on said carriage, crank means supported on top of said frame, means forming a driving connection between said motor and said crank means, other driving means connecting said motor to said traction rollers, and connecting rods connecting said crank means with said slide rods to oppositely reciprocate said slide rods.

5. In a ground working machine, the combination of a carriage having a vertically extending transverse frame on the forward end thereof, suspension arms pivotally supported on said carriage toward the front thereof and having laterally projecting hubs on their swinging ends, traction wheels mounted on said hubs, traction rollers rotatably carried by said transverse frame and in the plane of said wheels, lever means carried by said carriage and connected to said suspension arms to move the latter whereby said traction wheels move into and out of engagement with said traction rollers, a tool supporting structure pivotally supported on said frame and swingable about an upright axis and extending laterally therefrom, vertical guides carried by said supporting structure on opposite sides of said axis, portions of said supporting structure projecting laterally to engage the sides of said vertical frame and limit oscillation of said guides, slide rods vertically reciprocable along said guides and having tine supporting heads on their lower ends, a motor on said carriage, crank means supported on top of said frame, means forming a driving connection between said motor and said crank means, other driving means connecting said motor to said traction rollers, and connecting rods connecting said crank means with said slide rods to oppositely reciprocate said slide rods.

6. In a ground working machine, the combination of a carriage having a vertically extending transverse frame on the forward end thereof, suspension arms pivotally supported on said carriage toward the front thereof and having laterally projecting hubs on their swinging ends, traction wheels mounted on said hubs, traction rollers rotatably carried by said transverse frame and in the plane of said wheels, lever means carried by said carriage and connected to said suspension arms to move the latter whereby said traction wheels move into and out of engagement with said traction rollers, a tool supporting structure pivotally supported on said frame and swingable about an upright axis and extending laterally therefrom, vertical guides carried by said supporting structure on opposite sides of said axis, slide rods vertically reciprocable along said guides and having tine supporting heads on their lower ends, a motor on said carriage, crank means supported on top of said frame, means forming a driving connection between said motor and said crank means, other driving means connecting said motor to said traction rollers, and connecting rods having ball and socket connections at their ends and directly connecting said crank means with said slide rods to oppositely reciprocate said slide rods.

7. In a ground working machine, the combination of a mobile carriage, a vertical framework on the front of said carriage, a tool carrying frame supported on said vertical framework and oscillatable about a vertical axis intermediate of the sides of said carriage, a pair of vertical sleeves carried by said tool carrying frame and equally spaced on each side of said axis, said tool carrying frame having portions thereof extending laterally to engage the sides of said vertical framework and limit oscillation of said tool carrying frame, tool rods reciprocable in said sleeves, tool heads on the bottoms of said rods and projecting laterally to each side thereof, vertically downwardly extending hollow ground piercing tines on said heads, spring means connected between the sides of said heads and a fixed portion of said carriage and biasing said tool heads and said rods to a neutral transversely extending position, cranks rotatably mounted on top of said vertical framework and extending in opposite directions, means including connecting rods and slide bars drivingly connecting said cranks with said rods to reciprocate the latter, said slide bars having longitudinally and horizontally extending slots in their lower ends forming sliding connections to said tool rods, said sliding connections being engaged and maintained throughout the limited oscillation of said tool carrying frame, a motor mounted on said carriage, and means drivingly connecting said motor to said cranks, said motor being further connected to drive said carriage.

8. In a ground working machine, the combination of a mobile carriage, a vertical framework on the front of said carriage, a tool carrying frame supported on said vertical framework and oscillatable about a vertical axis intermediate of the sides of said carriage, a pair of vertical sleeves carried by said tool carrying frame and equally spaced on each side of said axis, said tool carrying frame having portions thereof extending laterally to engage the sides of said vertical framework and limit oscillation of said tool carrying frame, tool rods reciprocable in said sleeves, tool heads on the bottoms of said rods and projecting laterally to each side thereof, vertically downwardly extending hollow ground piercing tines on said heads, cranks rotatably mounted on top of said vertical framework and extending in opposite directions, means including connecting rods and slide bars drivingly connecting said cranks with said rods to reciprocate the latter, said slide bars having longitudinally and horizontally sliding connections to said tool rods, said sliding connections being engaged and maintained throughout the limited oscillation of said tool carrying frame, a motor mounted on said carriage, and means drivingly connecting said motor to said cranks.

9. In a ground working machine, the combination of a mobile carriage, an upright framework on said carriage, a tool carrying frame supported on said framework and oscillatable about a vertical axis, a pair of vertical guides carried by said tool carrying frame and spaced on each side of said axis, tool rods reciprocable on said guides, tool heads on the bottoms of said rods and projecting laterally to each side thereof, vertically downwardly extending ground piercing tines on said heads, cranks rotatably mounted on top of said vertical framework and extending in opposite directions, means including connecting rods drivingly connecting said cranks with said rods to reciprocate the latter, a motor mounted on said carriage, and means drivingly connecting said motor to said cranks.

10. In a ground working machine, the combination of a mobile carriage, an upright framework on said carriage, a tool carrying frame supported on said framework and oscillatable about a vertical axis, a pair of vertical guides carried by said tool carrying frame and spaced on each side of said axis, tool rods reciprocable on said guides, tool heads on the bottoms of said rods and projecting laterally to each side thereof, vertically downwardly extending ground piercing tines on said heads, cranks rotatably mounted on top of said vertical framework and extending in opposite directions, means including connecting rods drivingly connecting said cranks with said rods to reciprocate the latter, said connecting rods having ball and socket connections directly to said tool rods and said cranks, a motor mounted on said carriage, and means drivingly connecting said motor to said cranks.

11. In a ground working machine, the combination of a mobile carriage, a tool carrying frame supported on the front of said carriage and oscillatable about a vertical axis, vertically disposed guides on said frame disposed on either side of said axis, tool rods vertically reciprocably mounted on said guides, a ground working tools carried on the bottoms of said tool rods, a crankshaft extending transversely of said carriage and above said tool rods, ball elements eccentrically mounted on said crankshaft, other ball elements on the upper ends of said tool rods, connecting rods drivingly connecting said ball elements for alternate reciprocation of said tool rods, said connecting rods comprising oppositely extending pairs of socket forming plates, the opposed plates of each pair of plates having ball receiving socket recesses formed in the outer ends thereof, the pairs of plates of each connecting rod being angularly rotated 90° with respect to each other and the longitudinal axis of the connecting rod, and a motor on said carriage drivingly connected to said crankshaft.

12. In a ground working machine, the combination of a mobile carriage, a tool carrying frame supported on said carriage and oscillatable about an upright axis, vertically disposed guides on said frame disposed on either side of said axis, tool rods vertically reciprocably mounted on said guides, ground working tools carried on the bottoms of said tool rods, a crankshaft extending transversely of said carriage, ball elements eccentrically mounted on said crankshaft, other ball elements on the upper ends of said tool rods, connecting rods drivingly connecting said ball elements for alternate reciprocation of said tool rods, said connecting rods comprising oppositely extending pairs of socket forming plates, the opposed plates of each pair of plates having ball receiving socket recesses formed therein, the pairs of plates of each connecting rod being relatively angularly rotated about the axis of the rod, and a motor on said carriage drivingly connected to said crankshaft.

13. In a ground working machine, the combination of a mobile carriage, a tool carrying frame supported on said carriage and oscillatable about an upright axis, vertically disposed guides on said frame disposed on either side of said axis, tool rods vertically reciprocably mounted on said guides, ground working tools carried on the bottoms of said tool rods, crank means rotatable about a transverse axis on said carriage and above said tool rods, connecting rods drivingly connecting said tool rods and said crank means for alternate reciprocation of said tool rods, and a motor on said carriage drivingly connected to said crank means.

14. In a ground working machine, the combination of a mobile carriage, a tool carrying frame supported on said carriage and oscillatable about an upright axis, vertically disposed guides on said frame disposed on either side of said axis, tool rods vertically reciprocably mounted on said guides, ground working tools carried on the bottoms of said tool rods, crank means rotatable about a transverse axis on said carriage, connecting rods drivingly connecting said tool rods and said crank means for alternate reciprocation of said tool rods, and a motor on said carriage drivingly connected to said crank means.

15. In a ground working machine, the combination of a mobile carriage, a tool carrying frame supported on said carriage and oscillatable about an upright axis, vertically disposed guides on said frame disposed on either side of said axis, tool rods vertically reciprocally mounted on said guides, ground working tools carried on the bottoms of said tool rods, means limiting oscillation of said tool carrying frame to a short arc in a transversely extending position relative to said carriage, a motor on said carriage, means drivingly connecting said motor to said carriage to advance the carriage, and means drivingly connecting said motor to said tool rods to reciprocate said tool rods in alternate advancing timed relation.

16. In a ground working machine, the combination of a mobile carriage, a tool carrying frame supported on said carriage and oscillatable about an upright axis, vertically disposed guides on said frame disposed on either side of said axis, tool rods vertically reciprocally mounted on said guides, ground working tools carried on the bottoms of said tool rods, means limiting oscillation of said tool carrying frame to a short arc in a transversely extending position relative to said carriage, a motor on said carriage, and means drivingly connecting said motor to said tool rods to reciprocate said tool rods in alternate advancing timed relation.

CARL EDWIN FERGUSON.
KENDALL FERGUSON.
ROBERT C. FERGUSON.

No references cited.